March 31, 1942. K. L. LANNINGER 2,277,990
PIPE COUPLING
Filed Dec. 6, 1940 2 Sheets-Sheet 2

Inventor
K. L. Lanninger,
By Wachung & Groff
Attorneys

Patented Mar. 31, 1942

2,277,990

UNITED STATES PATENT OFFICE 2,277,990

PIPE COUPLING

Karl Ludwig Lanninger, Frankfort-on-the-Main-Rodelheim, Germany

Application December 6, 1940, Serial No. 368,914
In Germany April 11, 1940

5 Claims. (Cl. 285—172)

This invention relates to quickly connectible and disconnectible pipe couplings for connecting pipe sections which are likely to be angularly disposed.

Frequently it is necessary to lay pipes over uneven ground or carry them over obstacles which require the pipe sections to be disposed at various angles. Accordingly, the present invention has particularly in view a novel pipe coupling which permits of quickly and readily establishing an irregular line of piping and on the other hand, permits of quickly disconnecting the sections when required, the operation of assembling and disconnecting being greatly facilitated by mere manipulation of the clamping or connecting means. In that connection, a special feature of the invention resides in providing clamping or connecting means which adequately and tenaciously maintains the pipe sections connected even though they may move while connected. That is to say, the present invention provides a coupling wherein the keeper element of the locking means is curved in such a way as to correspond to the arc of movement of the toggle lever which forms a part of the connecting means. Another feature of the invention resides in so forming the end of the male pipe section that when the male and female sections are forced apart by the lever and toggle link, the male section will not be completely ejected from the female member and thus will not fall away until manually disconnected.

With the above and other objects in view, which will more readily appear as the nature of the invention is better understood, the same consists in the novel construction, combination and arrangement of parts hereinafter more fully described, illustrated and claimed.

A practical embodiment of the invention is shown in the accompanying drawings, in which.

Similar reference characters designate corresponding parts throughout the several figures of the drawings.

Figure 1:
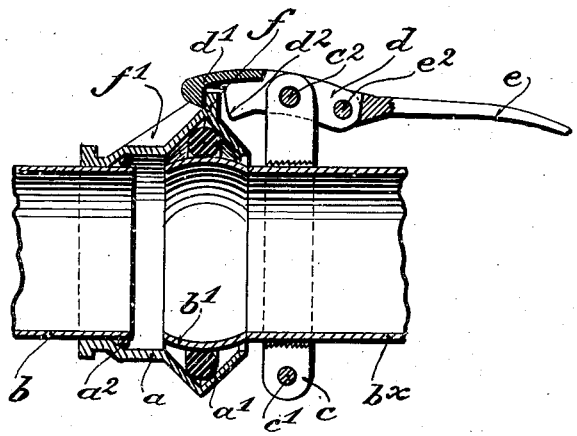
Figure 1 is a vertical sectional view of a pipe coupling embodying the present improvements, the parts being shown in locked position.
Figure 4:
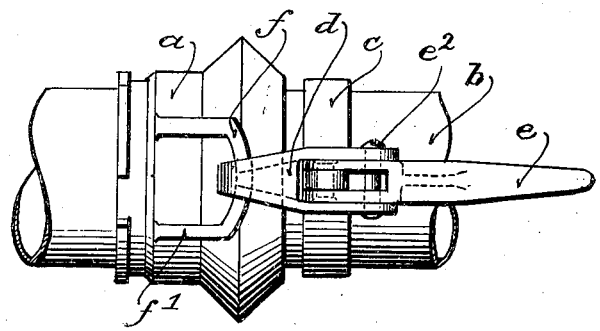
Figure 4 is a top plan view of the construction shown in Figure 1.

In the construction shown in Figure 1, one of the pipe ends $b$ carries a female part in the form of a coupling sleeve $a$ which is packed against the pipe end by means of the packing $a^2$ and in whose enlarged interiorly grooved portion there is provided a packing ring $a'$. The coupling sleeve or socket $a$ is provided on its outer face with a keeper element $f$, which as will be apparent from Figure 4, is curved transversely of the longitudinal axis of the socket. The curved keeper element $f$ is preferably connected with the rearwardly extending arms $f'$ so that the entire keeper is in the form of a bail, rigidly secured to an outer face of the socket member.

The male pipe section $b^x$ is provided with the bulbous portion $b'$ and the frontal shoulder or extension $b^2$ adapted to fit in the socket member $a$ to be engaged by the packing $a'$ to make a fluid-tight joint. The nature of the packing $a'$, the sleeve $a$ and the bulbous portion $b'$ is such that the pipe sections $b$ and $b^x$ can have relative angularity within reasonable operative limits.

The male element $b^x$ carries therewith a clamping ring $c$, which may be of two sections held together by a bottom pin $c'$ and a top pin $c^2$, the latter constituting a support for the bifurcated end of a manipulating lever $e$. Said lever $e$ is pivotally connected by a pin $e^2$ with the bifurcated end of a locking toggle link $d$. This link is provided at its free end with a hook in the form of a two-horned jaw, said horns constituting abutments $d'$ and $d^2$. The horn $d'$ is intended to engage one of the outer curved faces of the keeper element $f$ when the lever $e$ is positioned as shown in Figures 1 and 4, thereby to pull the sleeve $a$ and the pipe section $b^x$ together. When the parts are thus connected, it will be apparent that relative movement between the pipe sections $b$ and $b^x$ will be possible due to the fact that the space between the horns $d'$ and $d^2$ is wide enough to permit movement in a substantially vertical direction while the curvature of the keeper element $f$ will permit relative sidewise or transverse movement. Obviously, relative movement between the parts compounding these two directional movements is also possible.

Figure 8:
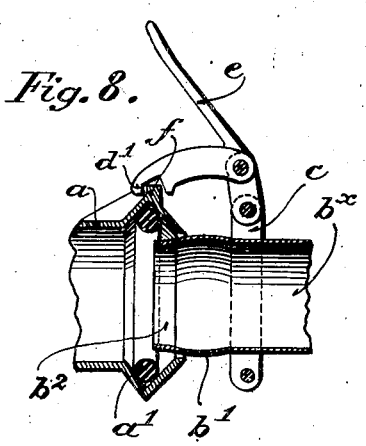
Figure 8 is a view similar to Fig. 1 with the parts unlocked, but the male member still resting or supported in the female member.

When it is desired to disconnect the pipe sections $b$ and $b^x$, the lever $e$ may be lifted upwardly, that is, moved away from the pipe section $b^x$ on the pivot $c^2$. This movement of the lever will cause the locking toggle link $d$ to also rise and move forwardly. In moving forwardly, the horn $d^2$ of the locking jaw will engage the opposite outer face of the keeper abutment $f$ and thus force the pipe section $b^x$ away from the coupling sleeve $a$. Thus, when the jointed arrangement consisting of the lever $e$ and the link $d$ are manipulated by raising the lever $e$, it will be apparent that the toggle lever arrangement is stretched and the lever $e$ as well as the link $d$ may be used to force the pipe sections apart. However, in forcing such sections apart, it will be understood that they may be formed so as not to be completely separated by the opening movement of the lever and toggle link, because the length of movement induced by the lever and link is not equal to the distance from the inner end of the extension $b^2$ to the mouth of the socket. Therefore, when the lever $e$ has reached the limit of its unlocking movement as shown in Fig. 8, the inner end of the extension $b^2$ still resides in the mouth of the coupling $a$ so that the male section will not fall away and must be intentionally separated.

Figure 2:
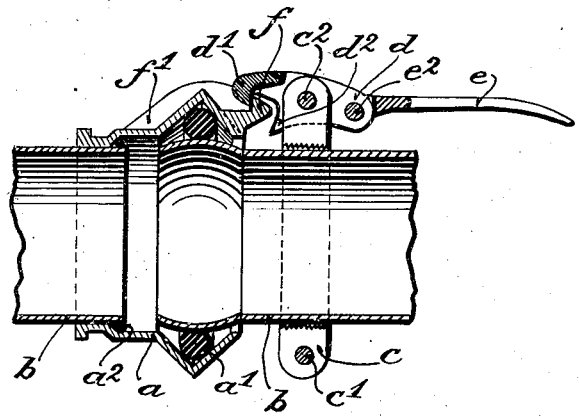
Figure 2 is a vertical sectional view similar to Figure 1 showing a modified form of keeper abutment and locking link.
Figure 5:
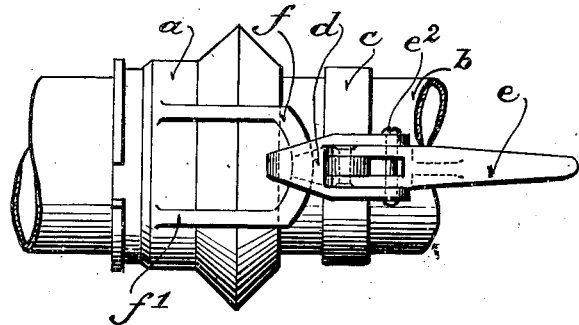
Figure 5 is a top plan view of the construction shown in Figure 2.
Figure 6:
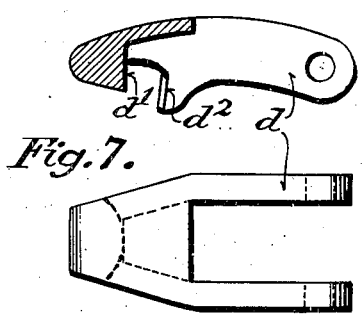
Figure 6 is a detail longitudinal sectional view of the locking link shown in Figures 1 and 2.
Figure 7:
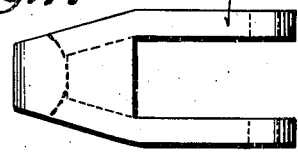
Figure 7 is a top plan view of the locking link shown in Figure 6.

Figure 2 of the drawings illustrates the same features shown in Figure 1, except that the curved keeper abutment $f$ is extended forwardly beyond the face of the coupling sleeve $a$. This will also be apparent from Figure 5. In both instances, the operation of connecting and disconnecting the pipe sections is the same.

Figure 3:
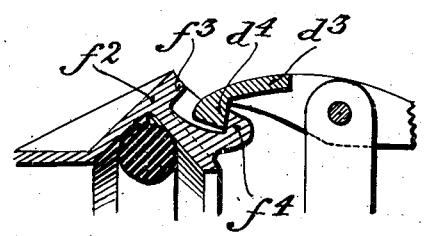
Figure 3 is a detail vertical sectional view showing a still further modified form of keeper abutment and locking link.

According to Figure 3, both the keeper abutment on the coupling sleeve and the toggle locking link are modified to produce the same results heretofore indicated. That is to say, the keeper element $f^2$ is formed with the opposite spaced abutment walls $f^3$ and $f^4$ which face each other and are preferably curved after the fashion of the front edge of the keeper element $f$ shown in Figures 1, 2, 4 and 5. The toggle locking link $d^3$ may be connected to the lever $e$ in the same manner as the link $d$. However, the forward or free end of the link $d^3$ is provided with a single hook portion $d^4$ which is intended to operate between the spaced abutment walls $f^3$ and $f^4$ of the keeper element $f^2$ according to whether the pipes are to be connected or disconnected. For example, when the pipes are to be connected, the hook portion $d^4$ of the link $d^3$ engages the abutment wall $f^4$ of the keeper element. On the other hand, when the pipes are to be disconnected by raising the lever $e$, the link $d^3$ will move forwardly and engage the abutment wall $f^3$ and thus enable the lever to forcibly separate the pipe connections.

In all forms of construction, it will be apparent that the curved keeper abutment is disposed outwardly of the outer surface of the coupling sleeve. In Fig. 1 the curved abutment is located laterally outward of the sleeve and in Fig. 2 it projects longitudinally outward. In Fig. 3, the curved keeper element is located both laterally and longitudinally outward of the sleeve. Moreover, the lever and its associated toggle link are carried by the male section of the pipes to be connected and the pivot which supports the lever is elevated considerably above the outer surface of the male section of the pipe so as to permit the locking end of the toggle link to engage the curved or arcuate surface of the keeper abutment more freely under varying degrees of angularity of the pipe sections. That is to say, by so mounting the lever relative to the keeper element ample clearance or play is provided between the clamping means and the pipes, so that said pipe sections may be more readily connected when the angle between them increases in degrees. In other words, by mounting the lever so that its pivot is offset relative to the pipe and also providing a curved keeper element which is also located considerably outward of the plane of the pipe section carried by the female element of the coupling, greater facility in connecting the angularly related pipes is afforded. Likewise, when disconnecting the pipes, the lever $e$ may be utilized more effectively in causing the toggle link to act as a forcible separating means for the pipe sections, and the extension $b^2$ acts as a temporary support for the male section when the bulbous section $b'$ is withdrawn from sealing contact with the packing $a'$.

I claim:

1. A quickly connectible and disconnectible pipe coupling for connecting pipe sections in universal angular relation including a female member, a keeper element rigidly carried by said female member, said keeper element being offset from an outer edge of the female member and being curved relative to the longitudinal axis thereof, a male member, and connecting means carried by and offset from said male member and cooperating with said curved keeper element, said means comprising a lever pivotally supported in offset relation to the outer side of the male member, a toggle link pivoted at one end to the lever eccentrically to the point of pivotal support of the lever, and hook means at the free end of said toggle link for engaging the curved abutment element in all angular positions of said male and female members.

2. A quickly connectible and disconnectible pipe coupling for connecting pipe sections in universal angular relation including, a female member, a male member, a keeper element curved on an arc whose axis lies in the plane of the longitudinal axis of the said female member, said curved keeper element being rigid with and offset from the outer face of said female member and presenting abutments at opposite sides thereof, a clamp fitted to the male member, an offset ear on the clamp, a lever pivoted to the ear, a toggle link pivoted to the lever eccentrically of the pivotal connection of the lever with the ear, and a two-horned jaw formed at the free end of the link and adapted to straddle said curved keeper element, one of said abutments of the keeper element engaging with one of said horns when the lever is moved to a position parallel to the male pipe section to pull the pipe sections together, and the other of said abutments engaging the other of said horns when the lever is raised to forcibly separate said male member from the female member.

3. A quickly connectible and disconnectible pipe coupling for connecting pipe sections in universal angular relation, including a sleeve constituting the female element of the coupling, a pipe section constituting the male element of the joint cooperating with said sleeve, a keeper element curved on an arc whose axis lies in the plane of the longitudinal axis of the sleeve, said keeper element being offset from and rigidly carried by said sleeve and presenting opposite inwardly facing abutments, a lever pivotally mounted on the male pipe section, a toggle link pivotally connected to said lever, said toggle link provided at its free end with a hook, the heel of said hook being adapted to engage one abutment face of the keeper element when the lever is moved toward the male pipe section thereby to lock said male section to the sleeve, and the nose of said hook being adapted to engage the other abutment face of the keeper element when said lever is moved away from the male pipe section to forcibly separate the coupling sleeve and male pipe section.

4. A quickly connectible and disconnectible pipe coupling for connecting pipe sections in universal angular relation, comprising, a pipe section, a female member in the form of a sleeve carried by said pipe section, a male pipe section bearing element in said sleeve, a keeper element curved on an arc transverse to the axis of and offset from an outer face of the female section, a male pipe section including a bulbous portion, an inner extension for said bulbous portion, a clamp carried by the male pipe section rearwardly of said inner extension, an offset ear carried by the clamp, a lever pivoted to the clamp, a link pivoted at one end to the lever at one side of the point of pivotal mounting of the lever on the ear and provided at its other end with a hook for engaging said curved abutment, said hook and abutment cooperating alternately to move the male section into and out of sealing engagement with the bearing element of the female member; the inner extension of the male member and said ear being so spaced that the movement of the link induced by the throw of the lever is not sufficient to withdraw the said inner extension from the mouth of the sleeve when the lever is moved to forcibly disconnect the male section from the sleeve.

5. A pipe coupling according to claim 1 wherein the female member is provided with an inwardly opening V-shaped groove, a gasket of annular cross-section fitted in said groove, and a bulbous end on the male member for bearing on said gasket when the members are connected.

KARL LUDWIG LANNINGER.